United States Patent
Hsieh

(10) Patent No.: US 11,788,661 B2
(45) Date of Patent: Oct. 17, 2023

(54) PARALLEL QUICK RELEASE COUPLING HAVING LEAKPROOF ARRANGEMENTS

(71) Applicant: Hung-Yu Hsieh, Taichung (TW)

(72) Inventor: Hung-Yu Hsieh, Taichung (TW)

( * ) Notice: Subject to any disclaimer, the term of this patent is extended or adjusted under 35 U.S.C. 154(b) by 15 days.

(21) Appl. No.: 17/679,316

(22) Filed: Feb. 24, 2022

(65) Prior Publication Data

US 2023/0265956 A1    Aug. 24, 2023

(51) Int. Cl.
| F16L 37/23 | (2006.01) |
| F16L 37/413 | (2006.01) |
| F16L 15/00 | (2006.01) |
| G06F 1/20 | (2006.01) |

(52) U.S. Cl.
CPC ........... *F16L 37/413* (2013.01); *F16L 15/008* (2013.01); *F16L 37/23* (2013.01); *G06F 1/203* (2013.01)

(58) Field of Classification Search
CPC ....... F16L 37/413; F16L 15/008; F16L 37/23; F16L 39/00
See application file for complete search history.

(56) References Cited

U.S. PATENT DOCUMENTS

| 420,209 | A | * | 1/1890 | Nilson | F16L 37/23 285/332.2 |
| 2,548,528 | A | * | 4/1951 | Hansen | F16L 37/32 137/614.04 |
| 3,170,667 | A | * | 2/1965 | Szohatzky | F16L 37/407 285/914 |
| 3,527,480 | A | * | 9/1970 | Larson | F16L 37/23 285/85 |
| 3,544,063 | A | * | 12/1970 | Barlow | E02F 9/2267 285/119 |
| 4,615,546 | A | * | 10/1986 | Nash | F16L 37/23 285/38 |
| 5,342,098 | A | * | 8/1994 | Wilkins | F16L 37/56 285/309 |
| 2012/0319397 | A1 | * | 12/2012 | Mahrenholz | F16L 39/00 285/308 |
| 2013/0134702 | A1 | * | 5/2013 | Boraas | F16L 37/23 285/120.1 |

FOREIGN PATENT DOCUMENTS

| DE | 3228434 A1 * | 3/1983 | |
| GB | 2183310 A  * | 6/1987 | .......... E21B 33/038 |

* cited by examiner

*Primary Examiner* — Zachary T Dragicevich
*Assistant Examiner* — James A Linford

(57) ABSTRACT

A quick release coupling includes male and female connector assemblies releasably secured together. The male connector assembly includes two parallel male connectors and the female connector assembly includes two parallel female connectors. A sleeve assembly is releasably connected to one ends of the female connectors. A plunger assembly is provided in each of the sleeve assembly and female connector. A sleeving assembly is provided on each of the female connector and the sleeve assembly. The parallel female connectors can be disconnected from the parallel male connectors or connected together at the same time. After the female connectors have disengaged from the male connectors, leakproof arrangements in the female connector assembly act to prevent water in the female connector assembly from leaking.

6 Claims, 12 Drawing Sheets

PARALLEL QUICK RELEASE COUPLING HAVING LEAKPROOF ARRANGEMENTS

FIELD OF THE INVENTION

The invention relates to couplings and more particularly to a parallel quick release coupling having leakproof arrangements used in fluid applications.

BACKGROUND OF THE INVENTION

Operations of integrated circuit (IC) chips play a great role in obtaining information. The higher the performance of IC chips, the greater the generated heat is. IC chips and substrates may malfunction due to high temperature. Fluid based cooling is critical to desktops, laptops and display cards. Thus, it is desirable to have a leakproof coupling used in fluid applications.

Referring to FIG. 15, it schematically depicts an application involved a conventional coupling including two female connectors 60 and two male connectors 61 connected to the female connectors 60 respectively. One female connector 60 is connected to an end of an inlet pipe 641 and the other female connector 60 is connected to an end of an outlet pipe 642. A water pipe 643 for absorbing heat is disposed in a laptop 63 and interconnects the male connectors 61. Hot water carried from the water pipe 643 flows to the outlet pipe 642 and in turn to a cooling device 62 to be cooled. The cooled water then flows to the water pipe 643 through the inlet pipe 641. This completes a cooling cycle. A leakproof arrangement is provided in the female connector 60. The male connectors 61 are smaller. The installation of leakproof arrangement may occupy internal space of the male connector 61, resulting in a decrease of the cooling water flowing through the male connector 61. Thus, there is no leakproof arrangement in the male connector 61. However, a connection of the female connector 60 to the corresponding male connector 61 may cause hot water in the water pipe 643 to leak out of the joining portion of the female connector 60 and the corresponding male connector 61, or a disconnection of the female connector 60 and the corresponding male connector 61 may cause hot water in the water pipe 643 to leak out of the disconnected portion of the female connector 60 and the corresponding male connector 61. When the pump of the cooling device 62 operates, a great quantity of cooling water may leak out of the disconnected portion of the female connector 60 and the corresponding male connector 61.

Thus, the need for improvement still exists.

SUMMARY OF THE INVENTION

It is therefore one object of the invention to provide a coupling comprising a male connector assembly including two male connectors, a first board, and two first nuts wherein the male connectors each are axially hollow and include an annular first flange on an outer surface, the first board includes two spaced first holes with the male connectors disposed through respectively, the first nuts are threadedly secured to the male connectors respectively, and the first board has one surface urging against the other surfaces of the first flanges so that the male connectors are parallel; and a female connector assembly including a board assembly and a sleeve assembly releasably disposed on the board assembly and releasably connected to the male connector assembly wherein the board assembly includes two female connectors, a second board, two second nuts, two plunger assemblies, and two sleeving assemblies; and the female connectors each are axially hollow and include an annular second flange on an outer surface, and an annular first groove adjacent to the second flange; wherein the female connector further comprises a sleeve sealing ring disposed on the first groove; wherein the second board includes two spaced second holes with the female connectors passing through respectively; wherein the second nuts each are threadedly secured to the female connector; wherein the second board urges against the other surface of each of the second flanges so that the female connectors are parallel; wherein the plunger assemblies are spring loaded and the plunger assemblies each are disposed in the sleeving assembly; wherein the sleeving assemblies each include a male connector sealing ring for the plunger assembly; wherein one end of the plunger assembly in the sleeving assembly is distal the second nut; wherein the female connector engages with one end of the plunger assembly so that the plunger assembly in the sleeving assembly is partially disposed in the female connector, and the sleeve assembly is disposed on the sleeving assembly and a portion of the female connector; and wherein the sleeve assembly includes two sleeve members and a third board having two spaced third holes each with an end of the sleeve member fastened therein; wherein when the male connectors each exert a force on each of the plunger assemblies and move toward the female connector, inside of each of the male connectors communicates with each of the plunger assemblies and inside of each of the female connectors; and wherein when the male connectors each do not exert a force on each of the plunger assemblies, the plunger assemblies are locked in the sleeving assemblies respectively and the plunger assemblies each do not communicate with inside of each of the female connectors.

The invention has the following advantages and benefits in comparison with the conventional art: the female connector assembly has two parallel female connectors which can be disconnected or connected at the same time. After the female connectors have disengaged from the male connectors, the leakproof arrangements in the female connector assembly act to prevent water in the female connector assembly from leaking.

The above and other objects, features and advantages of the invention will become apparent from the following detailed description taken with the accompanying drawings.

DETAILED DESCRIPTION OF THE INVENTION

Referring to FIGS. 1 to 10, a parallel quick release coupling in accordance with a first preferred embodiment of the invention comprises a male connector assembly 10 and a female connector assembly 20 releasably connected to the male connector assembly 10 as discussed in detail below.

Figure 3:
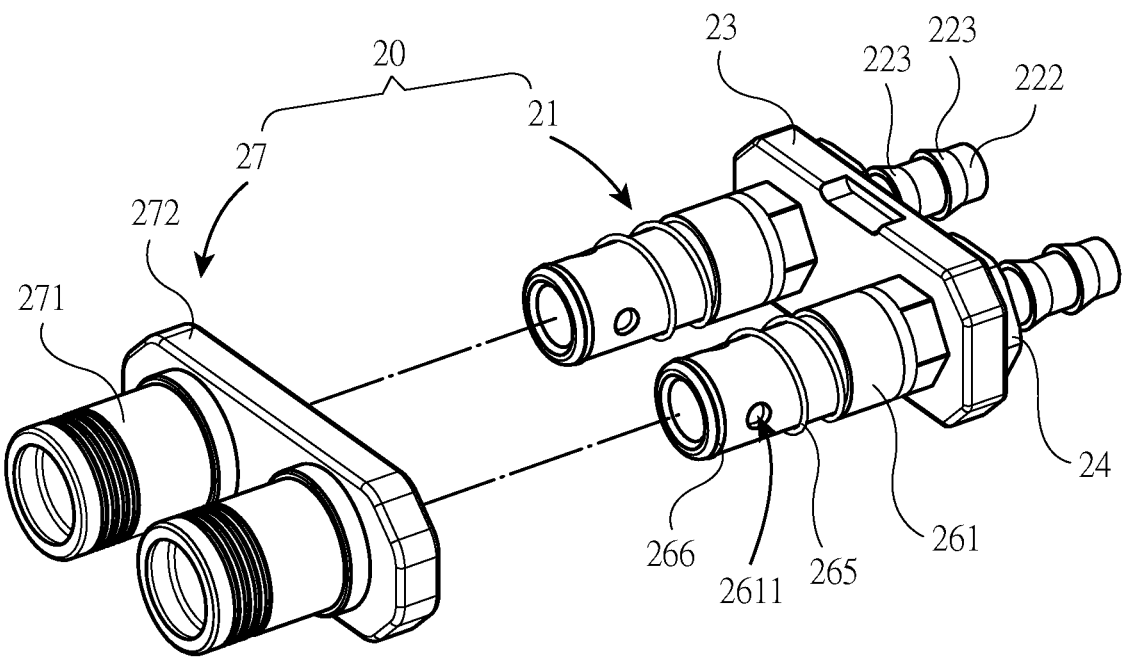
FIG. 3 is an exploded view of the board assembly and the sleeve assembly of the female connector assembly.

As shown in FIG. 3 specifically, the female connector assembly 20 includes a board assembly 21 and a sleeve assembly 27 releasably disposed on the board assembly 21.

Figure 2:
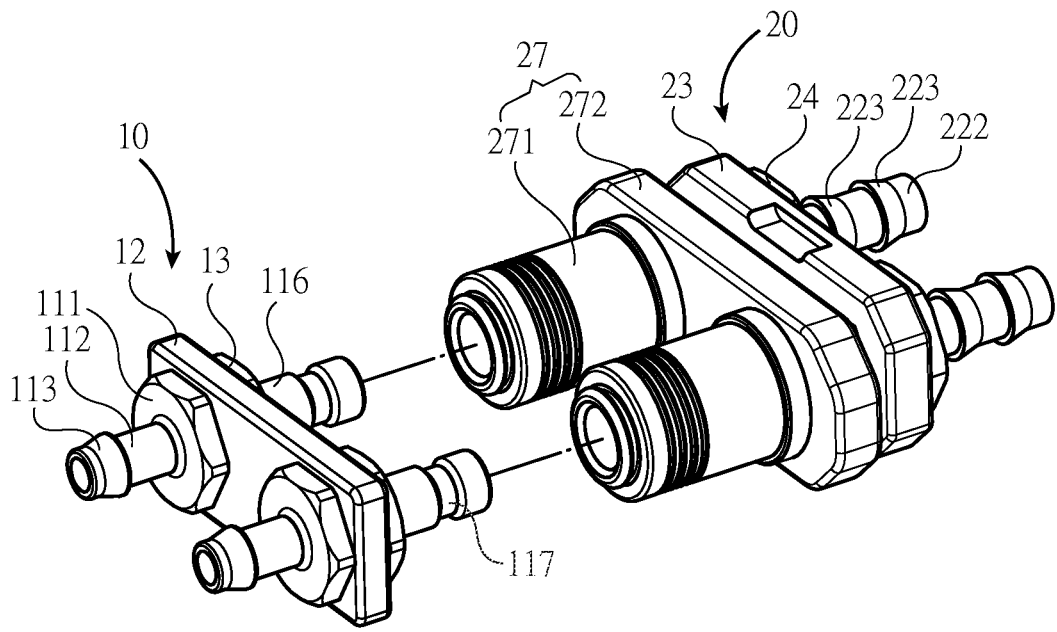
FIG. 2 is an exploded view of the male connector assembly and the female connector assembly.
Figure 4:
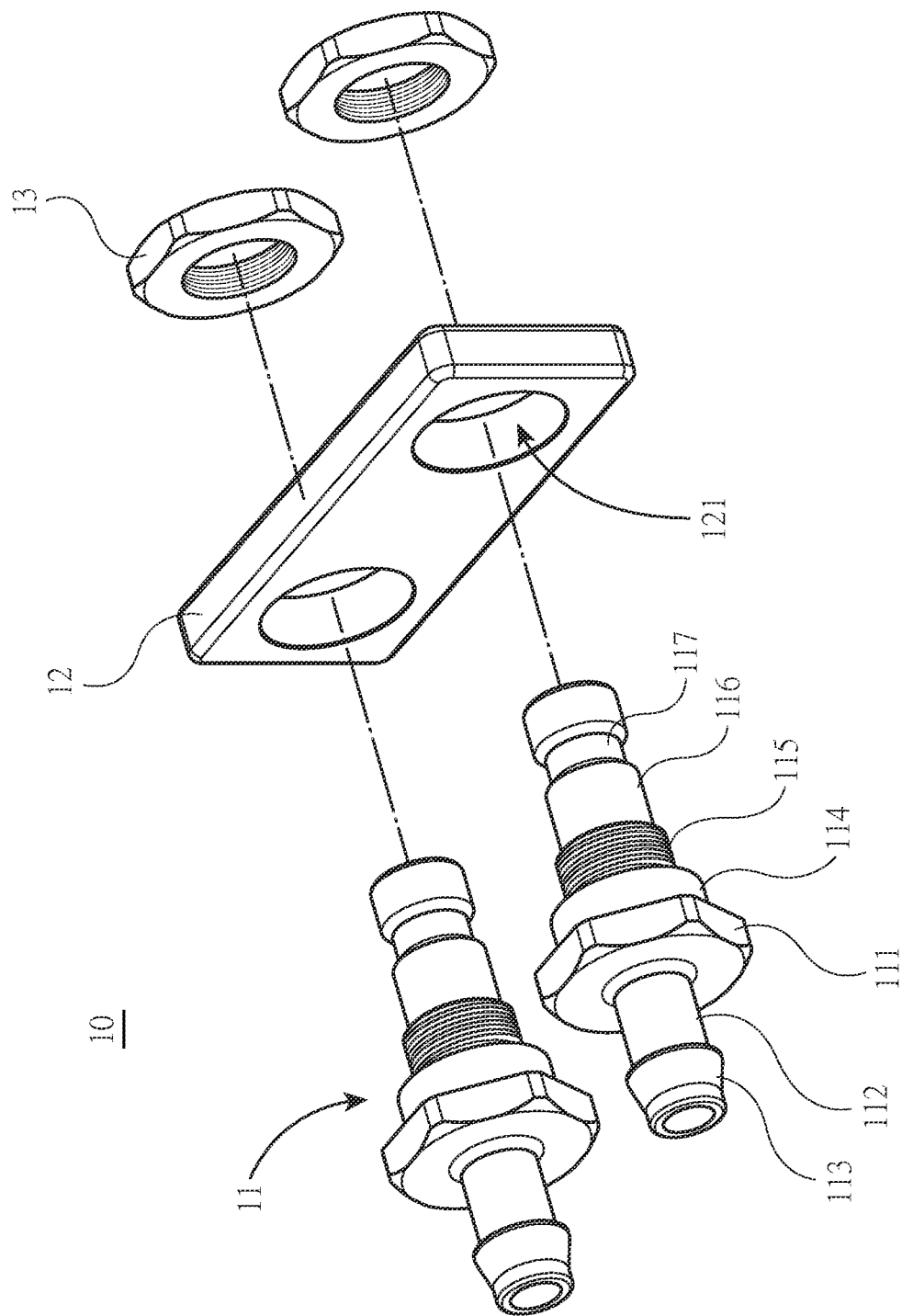
FIG. 4 is an exploded view of the male connector assembly.

As shown in FIGS. 2 and 4 specifically, the male connector assembly 10 includes two male connectors 11, a first board 12, and two first nuts 13. The male connector 11 is axially hollow and includes an annular first flange 111 on an outer surface. The first board 12 includes two spaced first holes 121 with the male connectors 11 disposed through respectively. The first nut 13 is threadedly secured to an externally threaded section 115 of the male connector 11. The first board 12 has one surface urging against the other surfaces of the first flanges 111 so that the male connectors 11 are parallel.

The male connector 11 further comprises an axial first extension 112 extending from one surface of the first flange 111, and a first enlargement 113 disposed at an open end of the first extension 112 and having a cross-section greater than that of the first extension 112. The diameter of the first enlargement 113 gradually increases toward the first extension 112. A support section 114, the externally threaded section 115, and a joining section 116 all axially, sequentially extend from the other surface of the first flange 111. A cross-section of the joining section 116 is less than that of the externally threaded section 115, the cross-section of the externally threaded section 115 is less than that of the support section 114, and the cross-section of the support section 114 is less than that of the first hole 121. An annular first groove 117 is formed on the joining section 116. The support section 114 is disposed in the first hole 121. The first nut 13 is threadedly secured to the externally threaded section 115.

Figure 5:
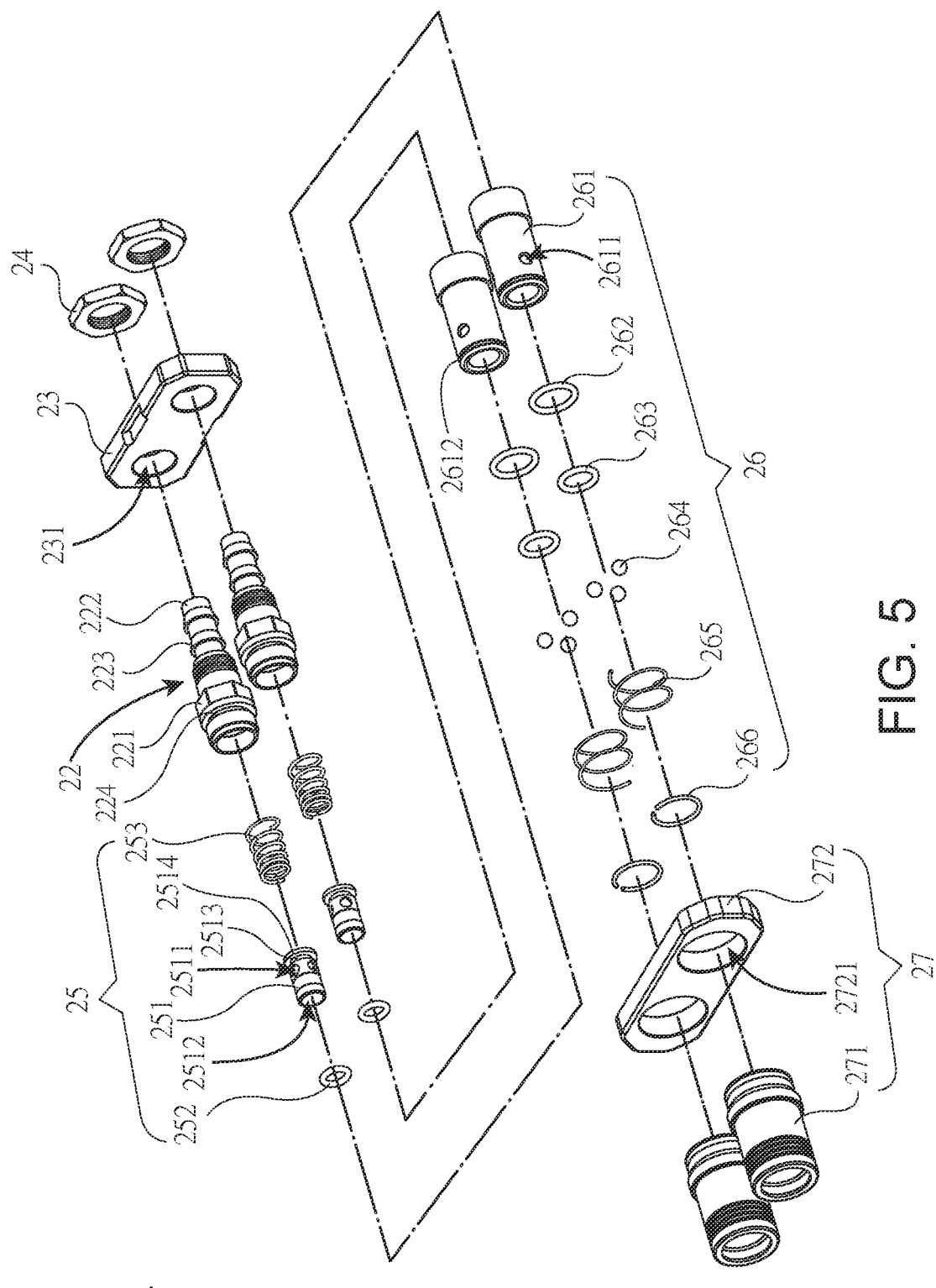
FIG. 5 is an exploded view of the female connector assembly.

As shown in FIGS. 2, 3 and 5 specifically, the board assembly 21 includes two female connectors 22, a second board 23, two second nuts 24, two plunger assemblies 25 and two sleeving assemblies 26. The female connector 22 is axially hollow and includes an annular second flange 221 on an outer surface, and an annular first groove 224 adjacent to the second flange 221. A sleeve sealing ring 262 is disposed on the first groove 224. Two spaced second holes 231 are through the second board 23. The female connectors 22 pass through the second holes 231 respectively. The second nut 24 is threadedly secured to an externally threaded section of the female connector 22. The second board 23 urges against the other surface of each second flange 221 so that the female connectors 22 are parallel.

The plunger assemblies 25 are spring loaded and the plunger assembly 25 is disposed in the sleeving assembly 26. The sleeving assembly 26 includes a male connector sealing ring 263 for the plunger assembly 25. One end of the plunger assembly 25 in the sleeving assembly 26 is distal the second nut 24 and the female connector 22 engages with one end of the plunger assembly 25. As such, the plunger assembly 25 in the sleeving assembly 26 is partially disposed in the female connector 22. The sleeve assembly 27 is disposed on the sleeving assembly 26 and a portion of the female connector 22. The sleeve assembly 27 includes two sleeve members 271, a third board 272, and two spaced third holes 2721 through the third board 272. One end of the sleeve member 271 is fastened in the third hole 2721 by means of threads or adhesive.

The female connector 22 further comprises a second extension 222 extending out of the second nut 24, and a plurality of (two) annular second latching sections 223 on the second extension 222, each second latching section 223 having an increased cross-section toward the second flange 221.

Figure 1:
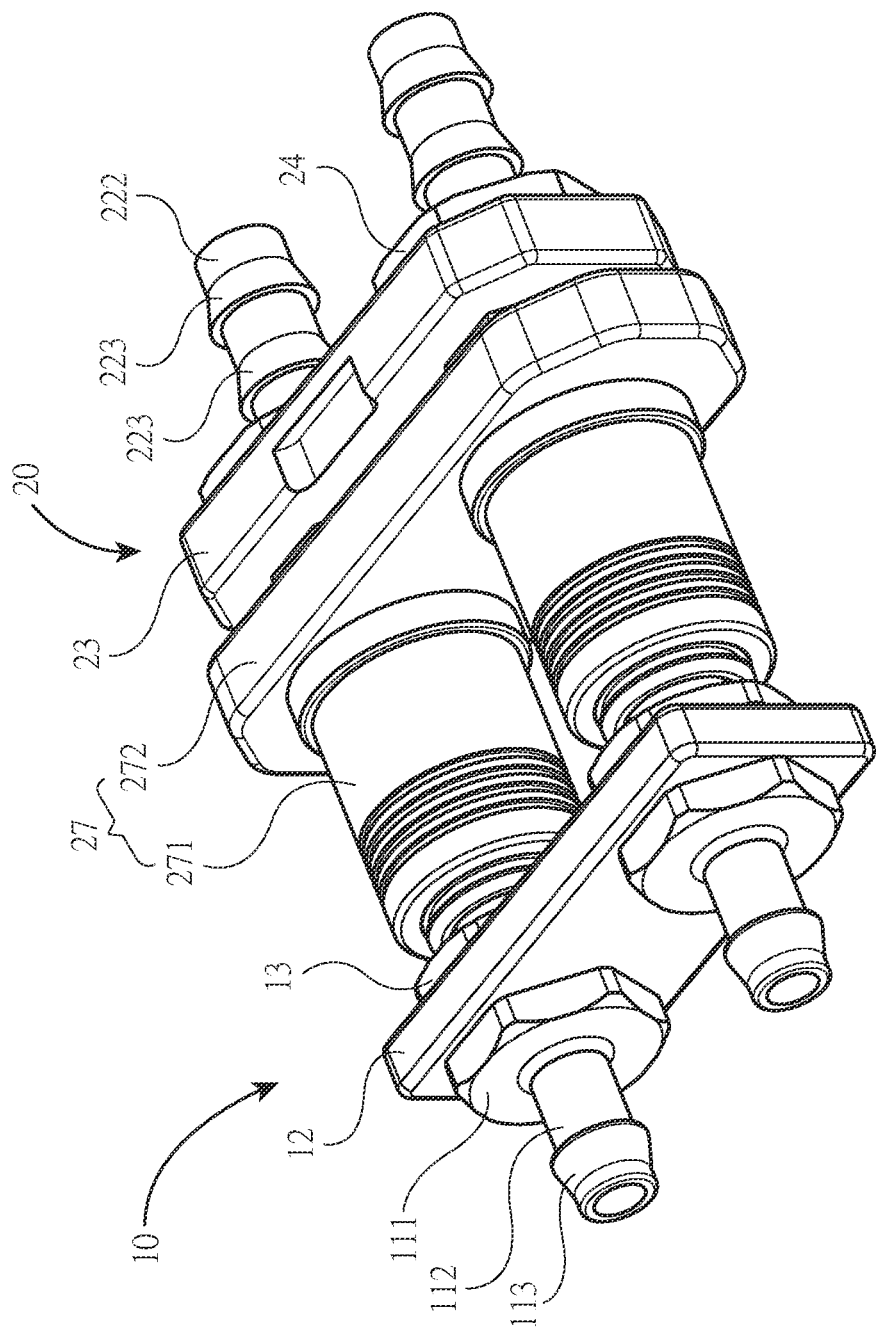
FIG. 1 is a perspective view of a parallel quick release coupling according to a first preferred embodiment of the invention.
Figure 6:
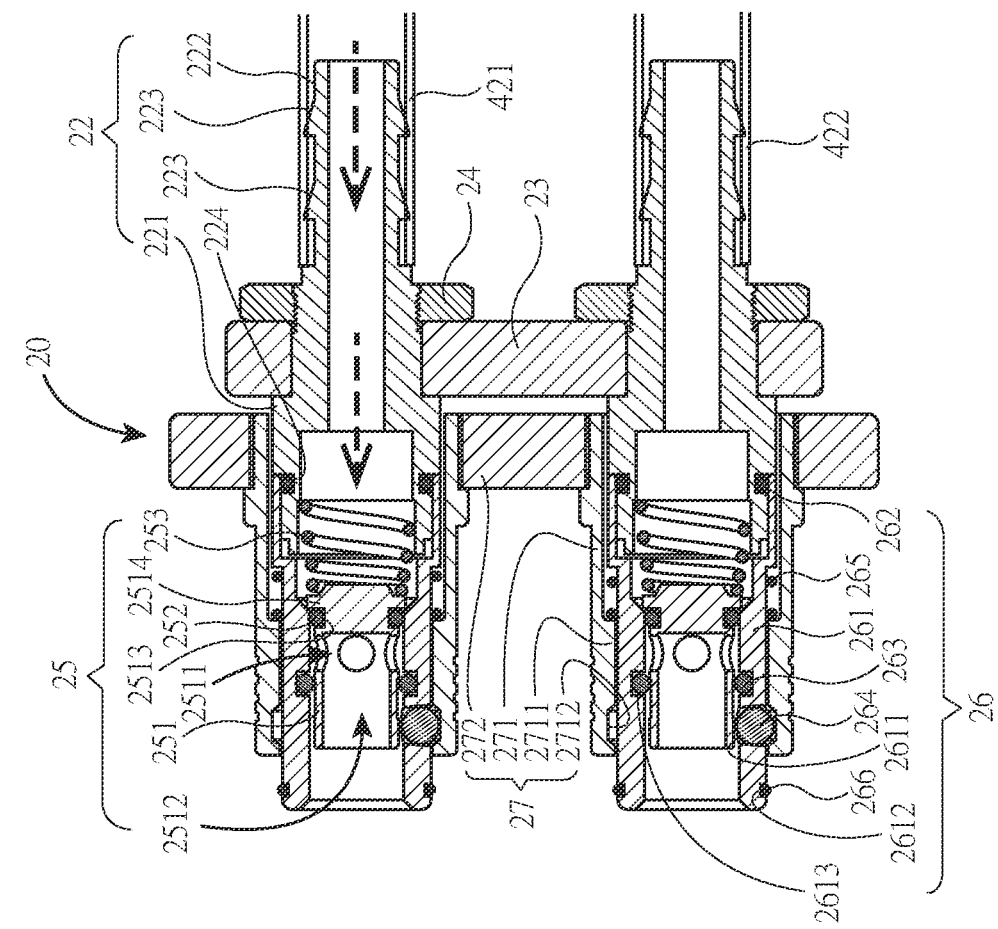
FIG. 6 is a sectional view depicting the steel balls disposed in the holes through the cylindrical surface of the sleeve with the sleeve spring being compressed by the sleeve member and water flow direction being indicated when the female connector assembly is disconnected from the male connector assembly.
Figure 6:
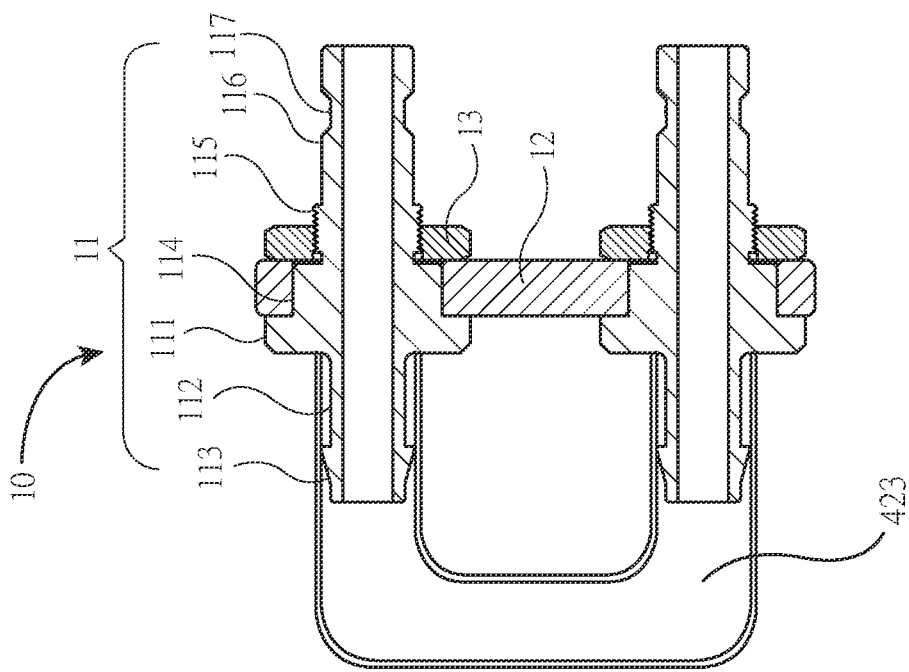
Figure 7:
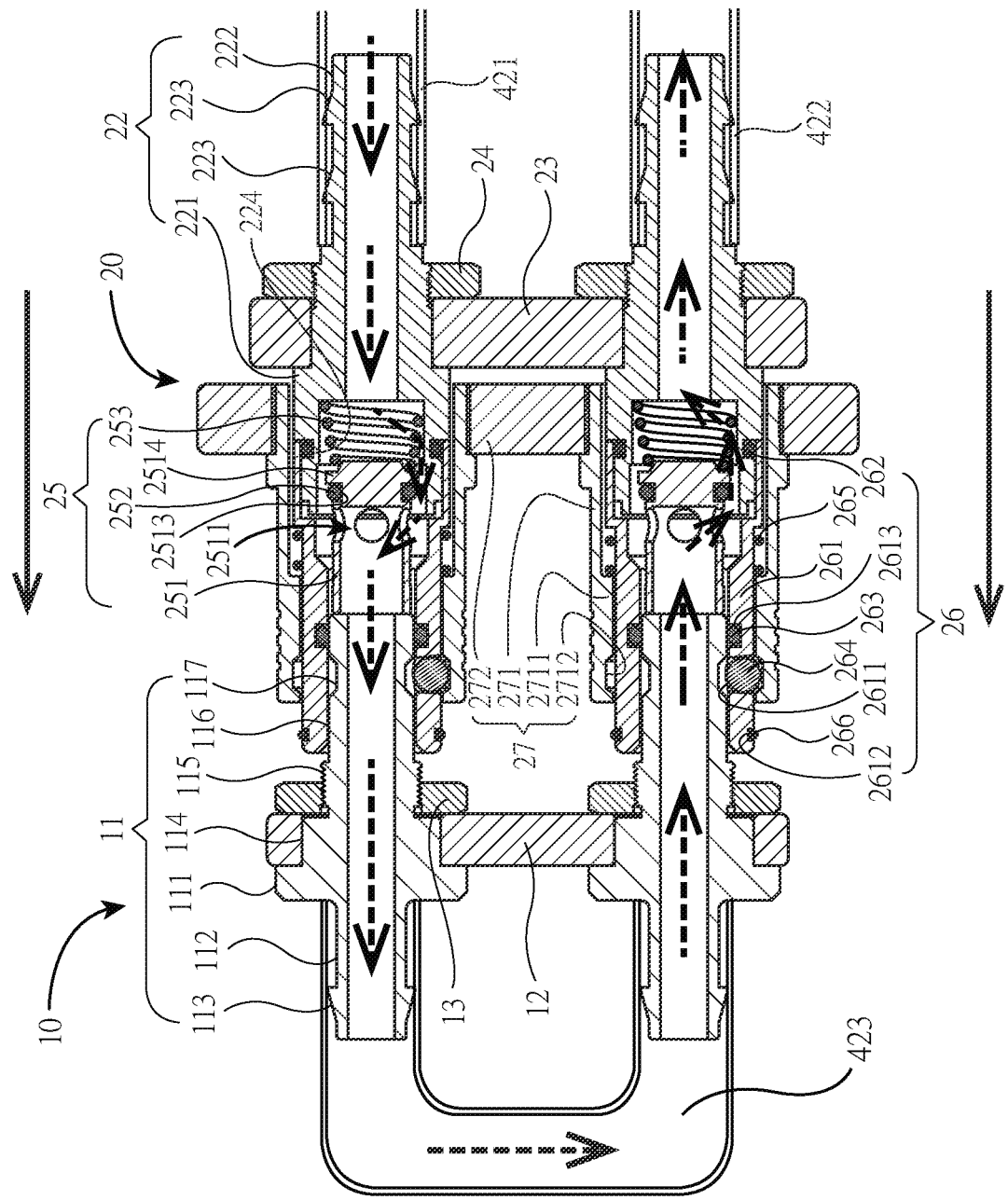
FIG. 7 is a sectional view depicting the male connectors urging against the plunger assemblies and water flow direction being indicated when the female connector assembly is connected to the male connector assembly.
Figure 8:
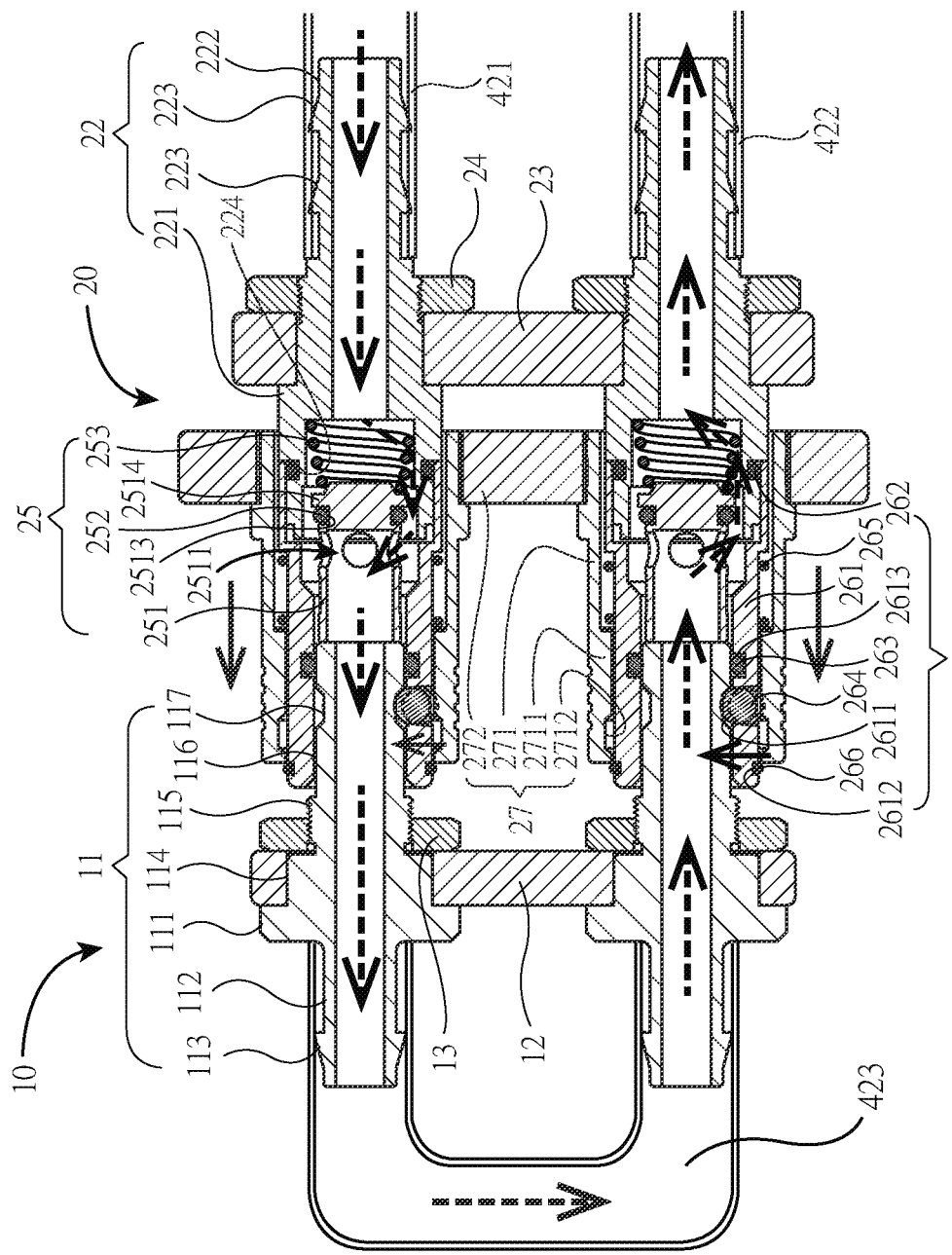
FIG. 8 is a view similar to FIG. 7 depicting the steel balls disposed in the first groove of the male connector with the sleeve spring being expanded to move the sleeve member toward the male connector assembly and water flow direction being indicated when the female connector assembly is connected to the male connector assembly.
Figure 9:
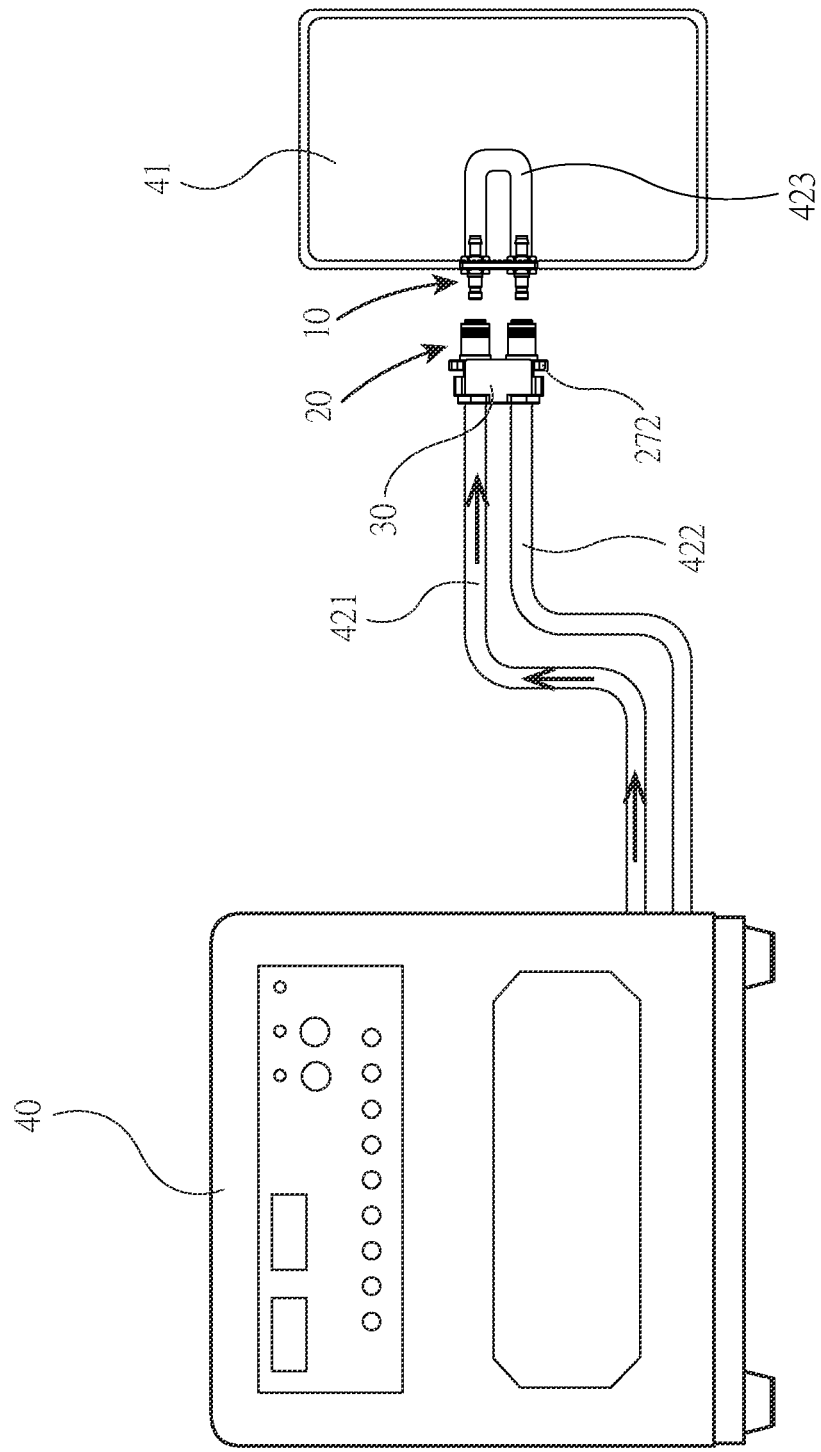
FIG. 9 schematically depicts an application of the parallel quick release coupling of the invention in which the male connector assembly is attached to a laptop, the female connector assembly is attached to an inlet pipe and an outlet pipe respectively, the female connector assembly is not connected to the male connector assembly, and a cyclic water flow path.
Figure 10:
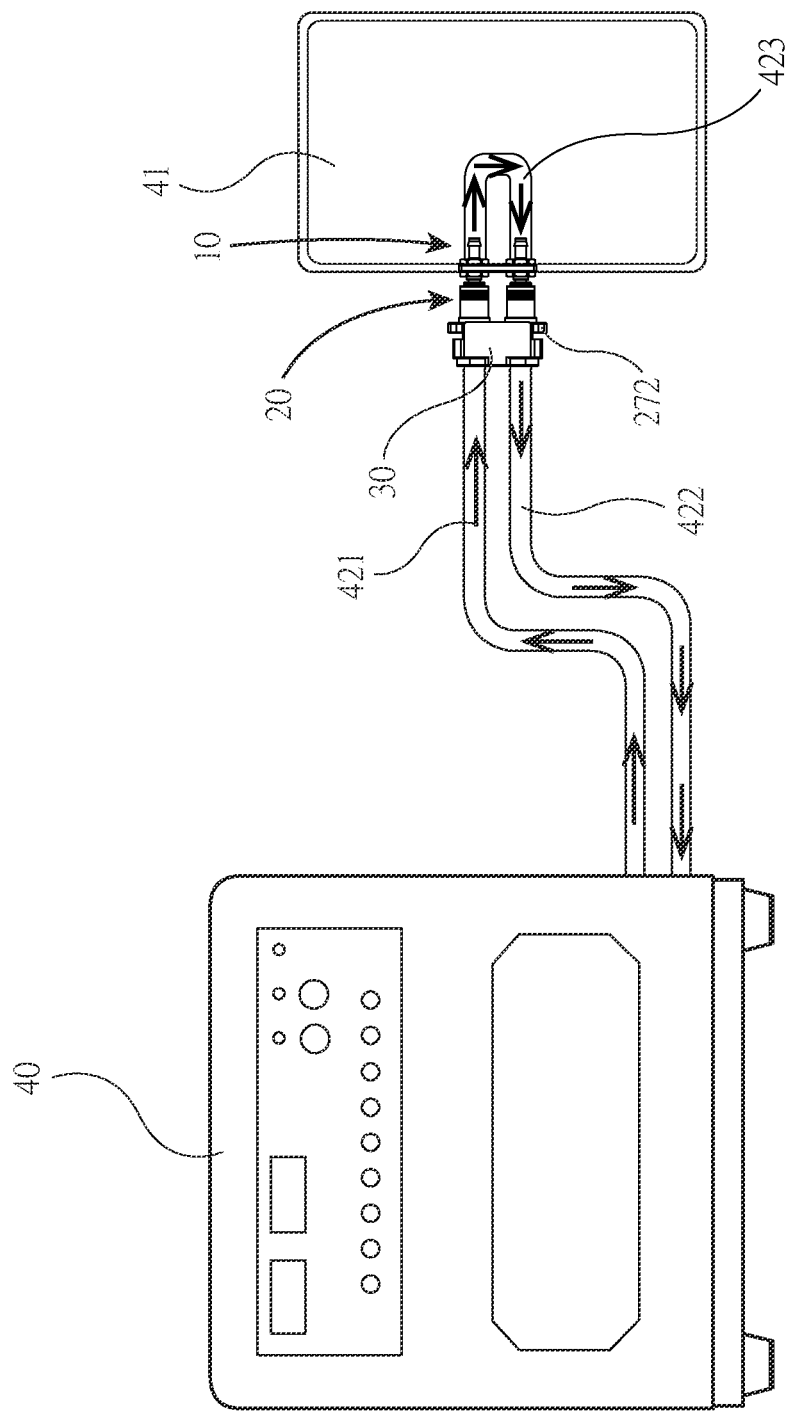
FIG. 10 is a view similar to FIG. 9 showing the two female connectors connected to the two male connectors respectively at the same time, and a cyclic water flow path.

As shown in FIGS. 1, 5 and 6 specifically, the plunger assembly 25 includes a plunger 251 including an opening 2512 at one end, an urging member 2514 at the blind other end, a plurality of through holes 2511 through a cylindrical surface of the plunger 251 and communicating with the opening 2512, an annular second groove 2513 disposed on the cylindrical surface and between the through holes 2511 and the urging member 2514, a plunger sealing ring 252 disposed in the second groove 2513, and a plunger spring 253 having one end urging against the urging member 2514 and the other end urging against a stepped-diameter bore section of the female connector 22, the plunger spring 253 being tapered from the female connector 22 to the plunger 251.

The sleeving assembly 26 includes a sleeve 261, a plurality of through holes 2611 through a cylindrical surface of the sleeve 261, a plurality of steel balls 264 disposed in the through holes 2611 respectively, an annular groove 2613 in an inner surface of the sleeve 261, the male connector sealing ring 263 disposed in the annular groove 2613, a sleeve spring 265 disposed on the sleeve 261, an annular groove 2612 in the cylindrical surface of the sleeve 261, and a C-shaped retaining ring 266 disposed in the annular groove 2612. The sleeve member 271 includes an annular raised section 2711 on an inner surface and an annular second groove 2712 adjacent to the raised section 2711. The sleeve spring 265 has one end urging against the raised section 2711. The steel balls 264 are disposed in the second groove 2712 with the sleeve spring 265 being compressed by the raised section 2711.

When the male connector 11 does not exert a force on the plunger assembly 25, the plunger assemblies 25 are locked in the sleeving assemblies 26 respectively. That is, the plunger spring 253 between the plunger 251 and the female connector 22 exerts a force on the plunger 251. Thus, each steel ball 264 is held in the through hole 2611 through the cylindrical surface of the sleeve 261, and the through holes 2511 through the plunger 251 are blocked by the inner surface of the sleeve 261. As a result, the opening 2512 of the plunger assembly 25 is prevented from communicating with inside of the female connector 22 through the through holes 2511.

As shown in FIGS. 7-10 specifically, the male connector 11 is attached to a socket on one side of a lap top 41. The female connectors 22 are connected to an inlet pipe 421 and an outlet pipe 422 respectively at the same time. A water pipe 423 for absorbing heat is disposed in the laptop 41 and interconnects the male connectors 11 of the male connector assembly 10. Water cooling carried out by the parallel quick release coupling is discussed below. When the male connector 11 exerts a force on the plunger assembly 25, the exerted force by the male connector 11 compresses the plunger spring 253 and moves the plunger 251 toward the female connector 22. When the joining section 116 of the male connector 11 moves into the sleeve 261 and the first groove 117 moves to the through holes 2611, the steel balls 264 are held in place by the first groove 117. And in turn, the sleeve spring 265 expands to push the sleeve member 271 toward a direct away from the third board 272. Thus, the male connector 11 is locked in the sleeve 261, thereby connecting the male connector assembly 10 and the female connector assembly 20 together. With the provision of the plunger sealing ring 252 and the male connector sealing ring 263, when the male connector assembly 10 and the female connector assembly 20 are connected together, the plunger sealing ring 252 and the mail connector sealing ring 263 urge against an outer surface of the plunger 251, the through holes 2511 communicate with the opening 2512 through inside of the male connector 11, and the through holes 2511 communicate with inside of the female connector 22. Fluid flows through the inlet pipe 421, one female connector 22, one corresponding male connector 11 and the water pipe 423 in the laptop 41 to absorb heat of the laptop 41. Hot water carried from the water pipe 423 flows through the other male connector 11, the corresponding other female connector 22, and the outlet pipe 422 prior to entering a cooling device 40 to be cooled. The cooled water then flows to the inlet pipe 421. This completes a cooling cycle. It is envisaged by the invention that the laptop 41 can be effectively cooled. With the provision of the female connector assembly 20, the parallel female connectors 22 are held in place. Thus, the female connectors 22 can be connected to the male connectors 11 respectively at the same time, or the female connectors 22 can be disconnected from the male connectors 11 respectively at the same time. Fluid begins to flow when the male connector assembly 10 and the female connector assembly 20 are connected together. Thus, leaking through any female connector 22 is prevented. The parallel quick release coupling of the invention can also be applied to a desktop or display card for absorbing heat generated in operation.

Figure 11:
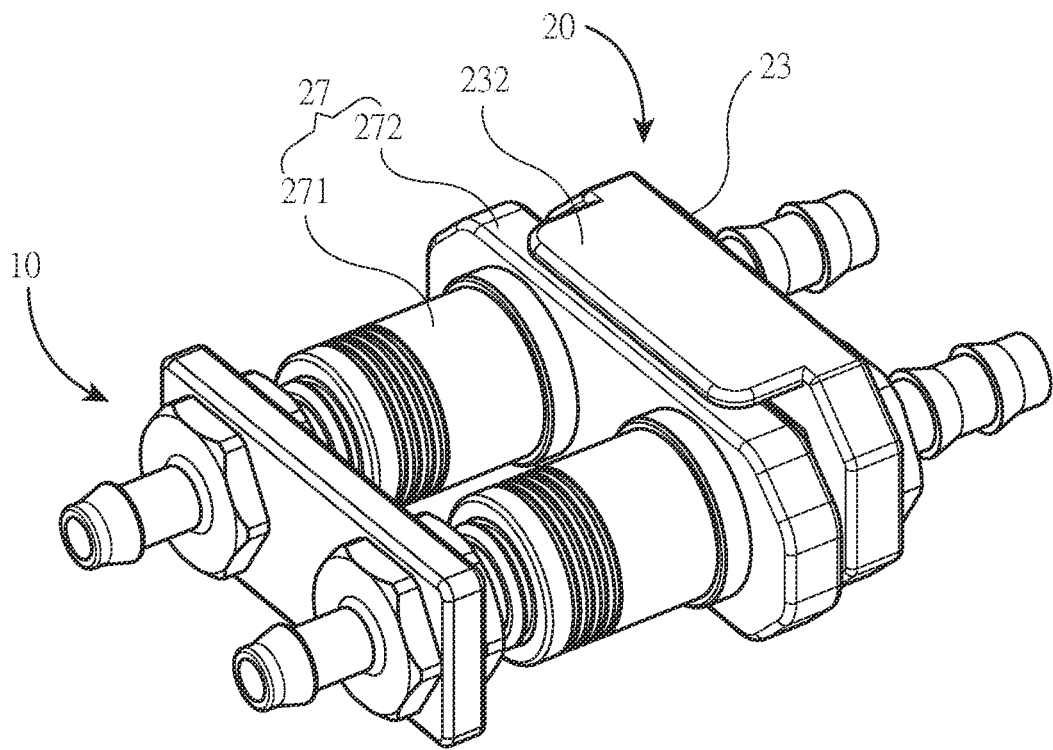
FIG. 11 is a perspective view of a parallel quick release coupling according to a second preferred embodiment of the invention in which two opposite cover plates extend out of the second board.
Figure 12:
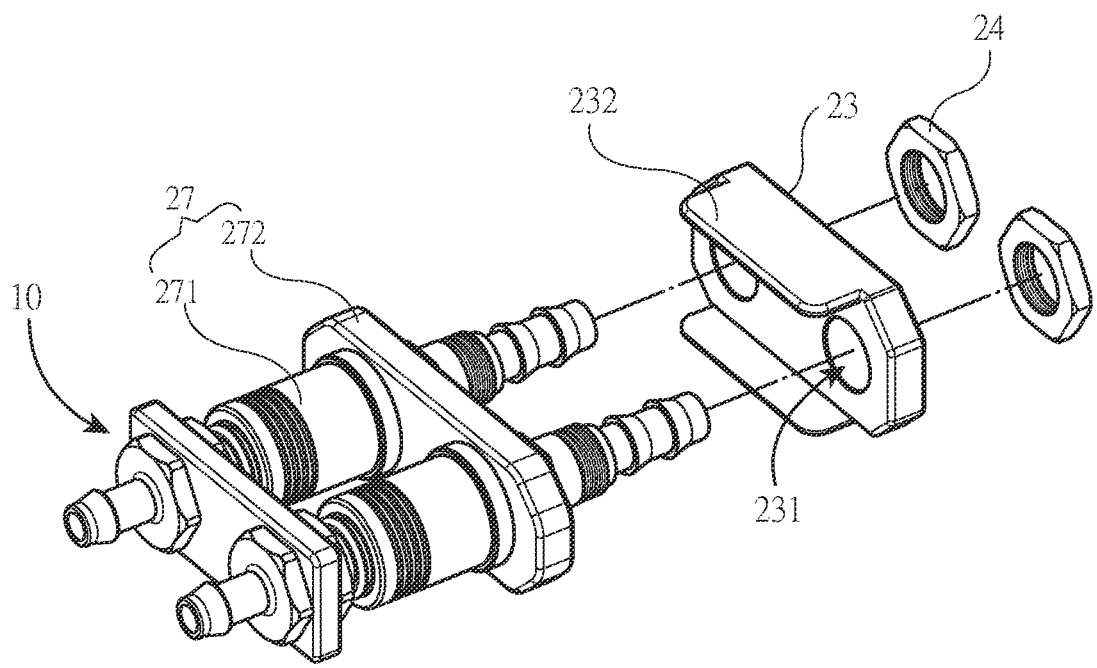
FIG. 12 is an exploded view of FIG. 11.

Referring to FIGS. 11 to 12, a parallel quick release coupling in accordance with a second preferred embodiment of the invention is shown. The characteristics of the second preferred embodiment are substantially the same as that of the first preferred embodiment except the following: Two opposite cover plates 232 extend horizontally out of elongated top and bottom of the second board 23 respectively. The cover plate 232 engages with top (or bottom) of the third board 272. In conjunction with FIGS. 1 to 10, tightly holding both the second board 23 and the third board 272 with the hand may lock the sleeve member 271 when the female connectors 22 are connected to the male connectors 11 or the female connectors 22 are disconnected from the male connectors 11. And in turn, the steel balls 264 are prevented from entering the first groove 117. This is not desired because it may leak water. It is envisaged by the invention that with the provision of the cover plates 232, it is possible to prevent a user from using the hand to tightly hold both the second board 23 and the third board 272. As a result, the possibility of leakage is greatly decreased.

Figure 13:
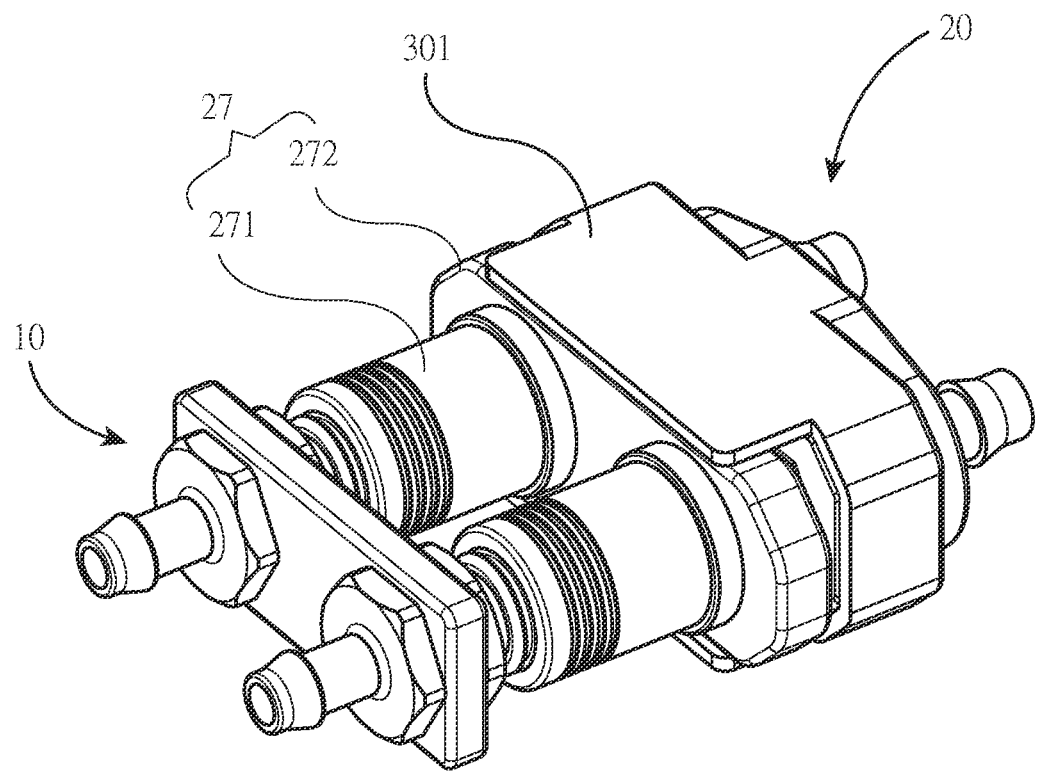
FIG. 13 is a perspective view of a parallel quick release coupling according to a third preferred embodiment of the invention in which a cover is provided on the female connector assembly.
Figure 14:
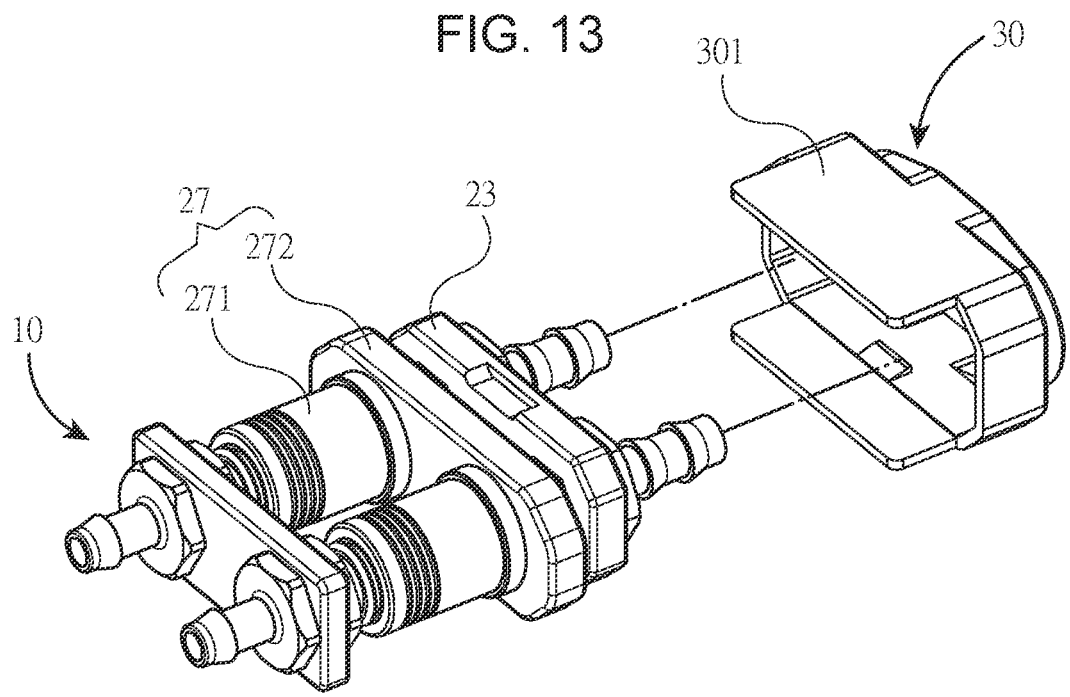
FIG. 14 is an exploded view of FIG. 13.
Figure 15:
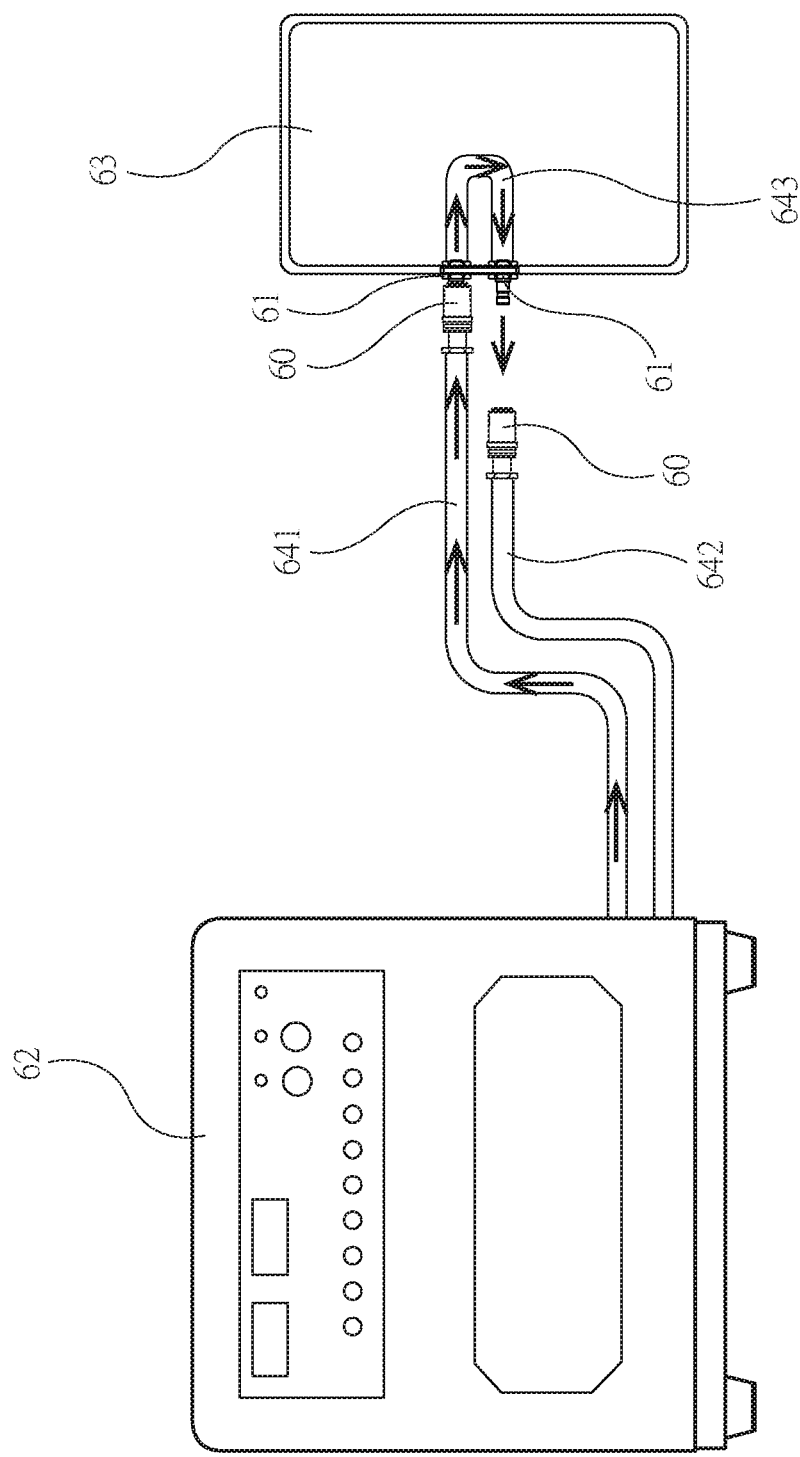
FIG. 15 schematically depicts a conventional coupling application in which two male connectors are attached to a laptop, two female connectors are attached to an inlet pipe and an outlet pipe respectively, one female connector is attached to the male connector, and a cyclic water flow path.

Referring to FIGS. 13 to 14, a parallel quick release coupling in accordance with a third preferred embodiment of the invention is shown. The characteristics of the third preferred embodiment are substantially the same as that of the first preferred embodiment except the following: A cover 30 is provided on the female connector assembly 20 and includes two covering plates 301 extending horizontally out of elongated top and bottom thereof respectively. The covering plates 301 engage with top and bottom of each of the second board 23 and the third board 272. Similar to the cover plates 232 of the second preferred embodiment, with the provision of the covers 30, it is possible to prevent a user from using the hand to tightly hold both the second board 23 and the third board 272.

While the invention has been described in terms of preferred embodiments, those skilled in the art will recognize that the invention can be practiced with modifications within the spirit and scope of the appended claims.

What is claimed is:

1. A coupling, comprising:
a male connector assembly including two male connectors, a first board, and two first nuts wherein the male connectors each are axially hollow and include an annular first flange on an outer surface of the male connector, the first board includes two spaced first holes with the male connectors disposed through respectively, the first nuts are threadedly secured to the male connectors respectively, and the first board has one surface urging against a bottom surface of the first flanges so that the male connectors are parallel,
wherein the male connectors each further comprise an axial first extension extending from a top surface of the first flange, and a first enlargement disposed at an open end of the first extension,
wherein the male connectors each further comprise a support section, an externally threaded section, and a joining section all axially, sequentially extending from the bottom surface of the first flange, and
wherein the male connectors each further comprise an annular first groove formed on the joining section; and wherein the support section is disposed in the first hole and the first nut is threadedly secured to the externally threaded section; and
a female connector assembly including a board assembly and a sleeve assembly releasably disposed on the board assembly and releasably connected to the male connector assembly wherein the board assembly includes two female connectors, a second board, two second nuts, two plunger assemblies, and two sleeving assemblies; and the female connectors each are axially hollow and include an annular second flange on an outer surface of the female connector, and an annular first groove adjacent to the second flange; wherein the female connector assembly further comprises a sleeve sealing ring disposed on the first groove; wherein the second board includes two spaced second holes with the female connectors passing through respectively; wherein the second nuts each are threadedly secured to the female connector; wherein the second board urges against a bottom surface of each of the second flanges so that the female connectors are parallel; wherein the female connectors each further comprise a second extension extending out of the second nut, and a plurality of annular second latching sections on the second extension, each of the second latching sections having an increased cross-section toward the second flange; wherein the plunger assemblies are spring loaded and the plunger assemblies each are disposed in the sleeving assembly; wherein the sleeving assemblies each include a male connector sealing ring for the plunger assembly; wherein one end of the plunger assembly in the sleeving assembly is distal the second nut; wherein the female connector engages with one end of the plunger assembly so that the plunger assembly in the sleeving assembly is partially disposed in the female connector, and the sleeve assembly is disposed on the sleeving assembly and a portion of the female connector; and wherein the sleeve assembly includes two sleeve members and a third board having two spaced third holes each with an end of the sleeve member fastened therein;

wherein when each of the male connectors exert a force on each of the plunger assemblies and move toward the female connector, inside of each of the male connectors communicates with each of the plunger assemblies and inside of each of the female connectors; and wherein when the male connectors each do not exert a force on each of the plunger assemblies, the plunger assemblies are locked in the sleeving assemblies respectively and the plunger assemblies each do not communicate with inside of each of the female connectors.

2. The coupling of claim 1, the first enlargement having a cross-section greater than that of the first extension, and a diameter of the first enlargement increasing toward the first extension; wherein a cross-section of the joining section is less than that of the externally threaded section, the cross-section of the externally threaded section is less than that of the support section, and the cross-section of the support section is less than that of the first hole.

3. The coupling of claim 2, wherein the plunger assemblies each include a plunger including an opening at one end, an urging member at an opposite end, a plurality of through holes through a cylindrical surface of the plunger and communicating with the opening, an annular second groove disposed on the cylindrical surface and between the through holes and the urging member, a plunger sealing ring disposed in the second groove, and a plunger spring having one end urging against the urging member and an opposite end urging against a stepped-diameter bore section of the female connector, the plunger spring being tapered from the female connector to the plunger.

4. The coupling of claim 3, wherein the sleeving assemblies each include a sleeve, a plurality of through holes through a cylindrical surface of the sleeve, a plurality of steel balls disposed in the through holes respectively, an annular groove in an inner surface of the sleeve, a male connector sealing ring disposed in the annular groove, a sleeve spring disposed on the sleeve, an annular groove in the cylindrical surface of the sleeve, and a C-shaped retaining ring disposed in the annular groove; wherein the sleeve member includes an annular raised section on an inner surface and an annular second groove adjacent to the raised section; wherein the sleeve spring has one end urging against the raised section; and wherein the steel balls are disposed in the second groove with the sleeve spring being compressed by the raised section so that when the steel balls are held in the first groove of the male connector, the sleeve spring expands to move the sleeve member toward a direction away from the third board.

5. The coupling of claim 4, further comprising two opposite cover plates extending out of elongated top and bottom the second board respectively wherein the cover plates engage with top and bottom of the third board respectively.

6. The coupling of claim 4, further comprising a cover on the female connector assembly, the cover including two covering plates extending out of elongated top and bottom thereof respectively, the covering plates engaging with top and bottom of each of the second and third boards.

* * * * *